(12) United States Patent
Green (10) Patent No.: US 10,664,331 B2
(45) Date of Patent: May 26, 2020

(54) GENERATING AN APPLICATION PROGRAMMING INTERFACE

(71) Applicant: Amazon Technologies, Inc., Seattle, WA (US)

(72) Inventor: Ryan Paul Green, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 396 days.

(21) Appl. No.: 15/279,007

(22) Filed: Sep. 28, 2016

(65) Prior Publication Data

US 2018/0089005 A1 Mar. 29, 2018

(51) Int. Cl.
*G06F 9/54* (2006.01)

(52) U.S. Cl.
CPC ............ *G06F 9/547* (2013.01); *G06F 9/54* (2013.01); *G06F 9/541* (2013.01)

(58) Field of Classification Search
CPC ............ G06F 9/547; G06F 9/54; G06F 9/541
See application file for complete search history.

(56) References Cited

U.S. PATENT DOCUMENTS

| 8,504,543 | B1 | 8/2013 | Andreessen et al. |
| 2016/0057207 | A1* | 2/2016 | Li ............... H04N 21/4431 709/203 |
| 2016/0162344 | A1 | 6/2016 | Hu et al. |
| 2016/0164953 | A1* | 6/2016 | Hristov ............... H04L 67/10 709/203 |

* cited by examiner

*Primary Examiner* — Doon Y Chow
*Assistant Examiner* — Kimberly L Jordan
(74) *Attorney, Agent, or Firm* — Thorpe North & Western, LLP.

(57) ABSTRACT

A technology is provided for generating a customized application program interface (API) in a service provider environment. A model is created of computing resources and data hosted by a service provider environment. An API is generated based on the model for the computing resources and the data, wherein the API is configured to enable the client to access the computing resources and data. Calls are received from the client at an API gateway hosting the API to access the data and the computing resources hosted by the service provider environment. A response to the calls is sent wherein the response is generated by the computing resources using the data accessible to the API in the service provider environment.

19 Claims, 7 Drawing Sheets

GENERATING AN APPLICATION PROGRAMMING INTERFACE

BACKGROUND

Computing systems may be found in the workplace, at home, or at school. Computing systems may include computing and data storage systems to process, transfer, and store data. Some computing systems have begun offering centralized, virtual computing options known as service provider environments that may reduce overall costs, improve availability, improve scalability, and reduce time to deploy new applications.

Computing systems and devices may be linked to one another via computing networks for exchanging data and content from one device to another. Computing systems may communicate with other networked computing systems across a network. Accordingly, computing systems may also access a service provider environment (e.g., a centralized virtual computing environment) using physical and virtual computing networks. Computing systems may also access services offered by the service provider environment using virtualized computing resources.

A computing system may rely on groups of remote computing systems and devices to store, manage, process, or provide data to the computing system. One device may have a different hardware or services capability from another device and sharing those capabilities may extend the capabilities of the devices. In addition, computing customers may use virtualized computing resources to access more powerful computing resources for more demanding computing tasks or less powerful computing resources for less intensive computing tasks in a dynamic fashion. A client device may be less powerful than compute power provided by remote services or virtualized computing resources, and the client device may access the data and resources of the remote services to extend the computing capabilities of the client device. Sometimes clients may access these remote services using application program interface (API) calls that are made to a service provider environment.

DETAILED DESCRIPTION

The present technology may relate to generating an application programming interface (API) for computing resources and data hosted in a service provider environment and making that API available to a client computer system or requesting processes. The service provider environment may host numerous computing resources and data where a subset of the computing resources and data are available through the API to a particular client or requesting process.

The service provider environment may comprise a modeler that models the computing resources and data that are available through the API to the particular clients or requesting processes. The modeler may generate the API where the API is customized or generated in order to specifically enable clients or requesting processes to access the computing resources and data in the service provider environment that are available to a requesting client, process, or service. The API may be hosted by the service provider environment at an API gateway that may host a plurality of customized APIs for a plurality of clients, requesting processes, or other services that customers want to access the APIs.

In one aspect, the computing resources and data available to the client may change during regular operations. This may include a change in what computing resources or data are available or the change may be a change in formatting or other protocols related to the computing resources and data. A modeler may be capable of determining or detecting these changes and may automatically update the API based on these changes. The initial generation of the API and the later updates to the API due to the changes made to the underlying data structures and computing resources may be accomplished without the user of the client being aware of the underlying details for the API being generated or the updates being made to the API. Thus, the API may be automatically created and dynamically updated with little or no input from a user or customer. The API may also be generated without a user requesting that the API be created, meaning that the user or the client associated with a user is insulated from the creation of the API or the updates to the API.

In one aspect, the present technology may include an API interpreter hosted at the client. The API interpreter may receive requests for data or commands from an application or process associated with the client. For example, the application and/or client may request data that is available from data stores and computing resources of the service provider environment. However, the request from the application may be in a data request format that is not compatible with making API calls that may be serviced by the computing resources and data of the service provider environment. The API interpreter may interpret or translate the request from the application or process in the data request format into an API call which is in a format compatible with an API that is associated with the computing resources and data of the service provider environment. The API call may be made to an API gateway which may execute the API request by accessing the requested data from the designed computing resources. The API gateway may then respond to the API call by returning data to the client. This data may be intercepted by the API interpreter that translates the data in the API response into a format compatible with the data request format used by the application. The client may specify in the request what format the API interpreter is to return the data. In one aspect, the API interpreter is automatically generated by the modeler at a service provider environment and then sent to the client. The API interpreter may be updated by the modeler based on changes made to the computing resources and data available to the client. Such updates or changes may be pushed to the API interpreter. In one aspect, the API hosted by the service provider environment that received an API call from the API interpreter is generated by the modeler specifically based on the computing resources and data accessible to the clients.

Figure 1:
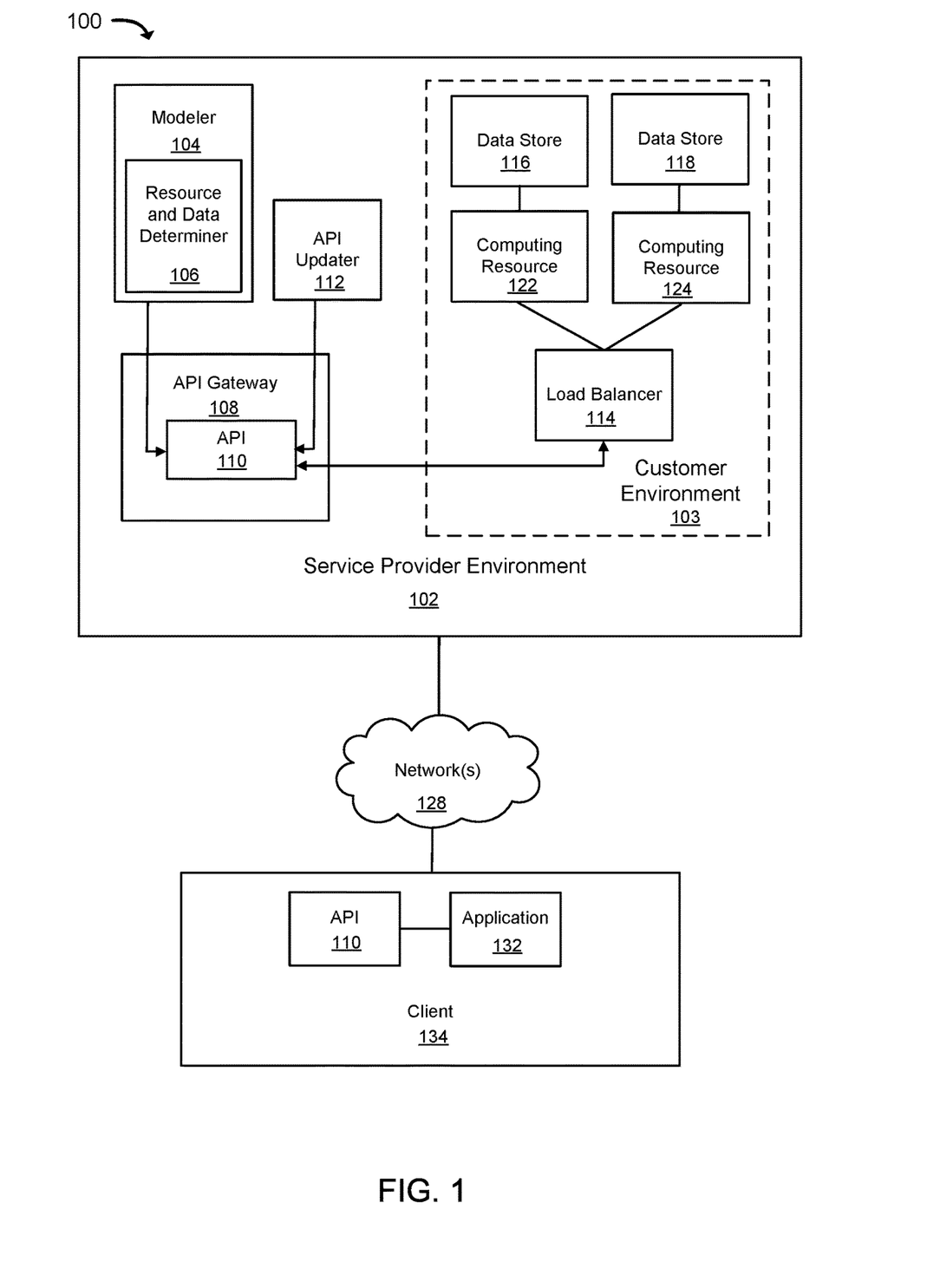
FIG. 1 is a block diagram illustrating a system for generating an application programming interface (API) according to an example of the present technology.

FIG. 1 illustrates a computing environment 100 for generating an API according to an example of the present technology. The computing environment 100 may include a service provider environment 102, a network 128, and a client 134.

In one aspect, the service provider environment 102 may offer centralized virtual computing services to a client 134, where the computing services are supported by computing systems and data that are located separately from the client and are accessed over the network 128. The client 134 may be a hardware client device, a software client, an application, a computing instance, or a service. The service provider environment 102 may offer computing resources to a plurality of different clients. In one aspect, the computing resources available to the client 134 are the resources represented in the customer environment 103. The computing resources may be virtualized computing resources (e.g., instances of virtual computers) and the virtualized computing resource may be hosted by one or more computer systems. The client 134 may have access to only a portion of the total computing resources and data available to the service provider environment 102 as defined by a specific customer account associated with the APIs. The computing resources and data available to the client 134 may be accessible using RESTful API calls. What is available to the client 134 via the API calls may depend on what computing resources the customer's account has provided to the APIs. The service provider environment 102 may have a number of hardware resources that can host a number of computing instances.

As depicted in FIG. 1, the computing resources of the customer environment 103 may be computing resources 122 and 124 where each of the computing resources 122 and 124 have access to data stored in the data stores 116 and 118. For example, the computing resources illustrated may be application servers containing business logic. In addition, the data stores 116 and 118 may be databases, object stores, or files that store data. Requests to access the computing resources 122 and 124 or the data stores 116 and 118 may be sent through a load balancer 114 that balances traffic for the computing resources and data of the service provider environment 102. It should be appreciated that the service provider environment 102 and the customer environment 103 may or may not include a load balancer or data stores and may comprise more or fewer computing resources than what is depicted by computing resources 122 and 124. More specifically, the computing resources in the customer environment 103 may vary depending on the computing resources the customer may have launched and/or the computing resources available through the service provider environment 102 (e.g., virtualized compute, virtualized storage, virtualized networking, data stores, databases, etc.).

In one aspect, the client 134 may make RESTful API calls to the API 110. A RESTful API calls may be an API call that conforms to the constraints of representational state of transfer (REST). REST may refer to an architectural style used in internet development for fast performance, reliability and the ability to scale. REST may be an architectural style for distributed hypermedia systems. A RESTful API (which may also be referred to as a RESTful web service) is an API implemented using HTTP and REST technology. REST may work with reusable components that can be managed and updated without affecting the system as a whole while it is running.

The service provider environment 102 may have virtual networks with underlying physical network substrates that connect the computing resources and data of the service provider environment 102. In one example, the client 134 may have access to a portion of the computing resources such as access to one computing resource 122 and access to the data in one data store 116. In such an example, specific relationships may be exist between the computing resource 122 and the data in the data store 116 that is available to the client 134.

The service provider environment 102 may also include a modeler 104 that is able to model these specific relationships or configured relationships of computing resources and data storage in the service provider environment 102 as well as other computing resources, data, metadata, and/or relationships for the client 134 or other clients not depicted. The modeler 104 may be configured to detect or determine the configurations and detailed attributes for the computing resources, data, and relationships via a resource and data determiner 106. The resource and data determiner 106 may be in contact with the components of the customer environment 103 that belong to a specific customer or that are identified by the customer, such as the computing resources 122 and 124 and the data stores 116 and 118, in order to determine what is available to a customized API that is being created. These computing resources, data, and relationships may then be modeled by the modeler 104. This model may use an entity data model. The information about the computing resources and data stores may be obtained by querying some of the information from the control plane of the service provider environment 102. In addition, a data store 116 may be examined or queried to determine structure of data in the data store 116. For example, a NoSQL data store may be queried to identify data stored in a key value format or to identify nested data structures in the value fields of data store such as JSON files, XML files or other structures contained within value fields of the NoSQL data store. In one aspect, the model is automatically generated by the modeler 104 without input from a user. In another aspect, the modeler 104 receives an initial input from a user regarding the model to be built. The modeler 104 may then build the model based in part on the input from the user and in part by data obtained by the resource and data determiner 106. In one aspect, the model is manually created and uploaded to the modeler 104.

By way of another example, a starting computing resource or node in a set of computing resources may be provided to the modeler 104. In this scenario, the modeler may traverse through a graph of computing resources to identify the graph and the linkages in the graph. Then the data or even services provided by computing resources may be identified.

In one aspect, the modeler 104 may then be able to use the model automatically to generate an API 110 specific to the computing resources and data made available by the customer and/or owner of the API and then the API may ultimately be made available to the client 134. The API 110 may be described as a custom or customized API 110. The API 110 may provide an interface that is customized or specific to the computing resources and data stores that are made accessible by a customer in the service provider environment 102. This accessibility may be provided by a customer granting access rights or permission to the API in order to supply the resources on which the API can call. The API 110 may be used by the client 134 or by an application 132 associated with the client 134 to access the computing resources and data hosted by the service provider environment 102. The modeler 104 may automatically generate the API 110 upon simply receiving a request and/or initial input from the user or client 134 but the user or customer may not have to define the details of the API because that modeling is performed automatically.

The API 110 may be described as a set of defined interface calls, subroutine definitions, protocols, and tools for providing computing services to a requesting client. The API 110 may provide building blocks that may be employed by the client 134 to access the computing resources and data of the service provider environment 102 as designated by a customer of the service provider environment 102. In one aspect, the API 110 may be associated with a graphical user interface and integrated development environment (IDE). Thus, the API 110 may be provided along with a software development kit (SDK) for the client to perform functions related to the available computing resources and data. For example, the ability to perform metrics on the API and related analysis. For example, the ability to perform metrics on the API and related analysis. The SDK may also include debugging facilities, other utilities, and the integrated development environment (IDE) in one package. Further the SDK may include sample code, sample API calls and supporting technical notes or other supporting documentation.

In one aspect, the API 110 may be hosted by the service provider environment 102 at an API gateway 108. The API gateway 108 may be described as an API gateway that is designed to receive requests or API calls from the client 134 or other applications. In one configuration, the API 110 may also be sent to the client 134 to be hosted by the client system so that API calls may be sent from the application 132 at the client to the API 110 hosted at the client. The API 110 hosted at the client may directly access the computing resources and data available to the client 134 without going through an API at the API gateway 108 or may send the calls 130 to an API at the API gateway 108.

The API 110 may be used by the client 134 or the application 132 of the client 134 to make API calls or issues commands to the service provider environment 102. The commands may be, but are not limited to commands to: create, read, update, and/or delete data available to the client 134. The commands create, read, update, and delete together may be described as CRUD commands to perform basic functions related to persistent storage and the computing resources that interface with the data stores 116 and 118. CRUD commands may also refer to retrieve, modify, and destroy. In one aspect, the API 110 employs HTTP (hypertext transfer protocol) and/or the JavaScript Object Notation (JSON) format to receive and respond to API calls.

In one aspect, the APIs may change after the API 110 has been generated. For example, the API may have access to the computing resource 122 but the computing resource may be subsequently be changed by the service provider environment 102. This may cause the API 110 to no longer function properly as it was generated for a computing resource that has been modified. The API 110 may employ the resource and data determiner 106 to determine that such changes have been made. The modeler 104 in conjunction with the API updater 112 may then dynamically update the API 110 that is being hosted on the API gateway 108. The API updater 112 may also update the API 110 hosted at the client 134.

In one aspect, the API 110 may function to control the data that is returned to the client 134. For example, the client 134 may be a mobile device and the application 132 is designed specifically for use with the mobile device. The application 132 may send a request for data, but the mobile device does not desire all data that may be returned based on the request. For example, the requested data may be for a customer's records hosted in data store 116. The customer records may contain customer names as well as other customer details, but the application 132 for the mobile device may have limited the requested data to the customer name. The API 110 may then function to restrict or control the data returned from the data store 116 to only include the customer name. Thus, the client request may be to request specific data that is populated in a certain field.

In one aspect, the data requested by the application 132 may cause the API 110 to filter data received from the data store based on what was requested. The API 110 may then only return filtered data based on the request by the application 132. In other words, not all data returned to the API 110 by the data store is necessarily returned to the application 132 or client 134. This may be referred to as filtering, transforming, or changing the representation of the data received at the API 110 from the data stores.

Figure 2:
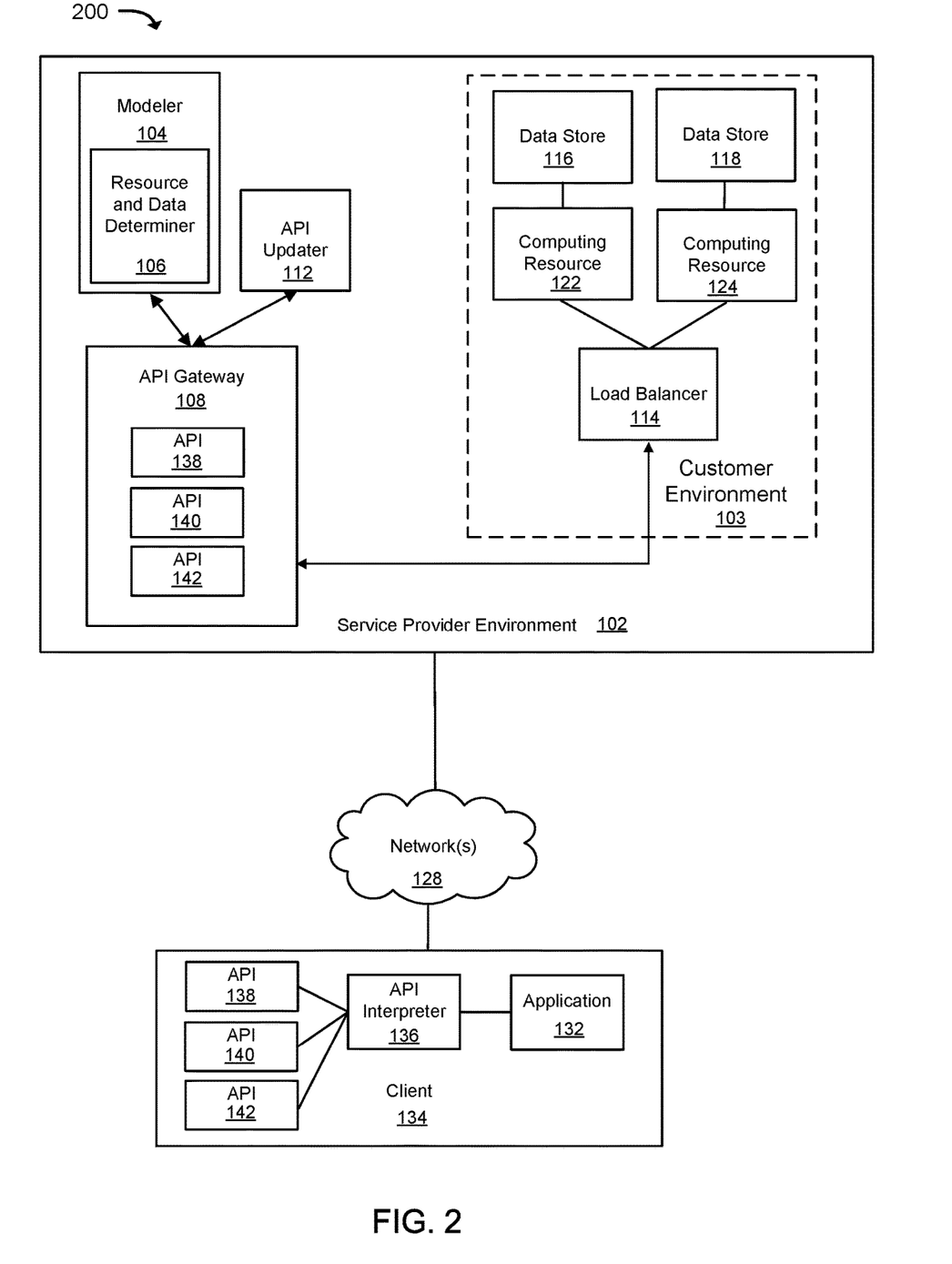
FIG. 2 is a block diagram illustrating a system for generating an API interpreter according to an example of the present technology.

FIG. 2 illustrates a computing environment 200 for providing a distributed interface for an API according to an example of the present technology. The computing environment 200 may comprise an API interpreter 136 and may include some or all of the features, components, and capabilities of the computing environment 100 of FIG. 1.

The client 134 of the computing environment 200 further comprises the API interpreter 136. The API interpreter 136 may receive requests from the application 132. For example, the request may be a request for data or to obtain data located in a data store hosted by the service provider environment 102 that is available via the API. The request from the application 132 may be in a format such as a data request format that is compatible with the application 132. The data request format may not be recognizable or compatible with the computing resources and data of the service provider environment 102. In addition, the request or the data request format may not be an API call.

The API interpreter 136 is able to understand the request in the data request format and interpret or translate the request to an API call that is understood by or compatible with API and further with the computing resources and data of the service provider environment 102. The service provider environment 102 may then return the data to the API interpreter 136 in response to the API call the API interpreter 136 may then translate the data in the response into the data request format or other format compatible with the application's 132 original data request. In one aspect, the request from the application 132 may specify what format the data is to be returned to the application 132. The API interpreter 136 may then be able to translate the data into the specified format before returning the data to the application 132.

In one aspect, the request from the application 132 may be for data that is associated with more than one data store at the service provider environment 102 or more than one API associated with the computing resources of the service provider environment 102 such as the APIs 138, 140, and 142. The additional APIs may also have definitions stored on the client 134 for use by the API interpreter. The API interpreter 136 is then able to split or divide one data request into more than one API call. For example, the application 132 may request data related to a customer record including customer name, social security number, and address. However, the customer name may be located in a first data store 116, the social security number located in a second data store 118, and the address may be located in third data store 120, where each of the data stores 116 and 118 are accessed by APIs 138, 140, and 142 respectively. The API interpreter 136 may then split the request into three API calls, one for each of the APIs 138, 140, and 142. The API calls may then be sent to the APIs 138, 140, and 142 hosted by the API gateway 108 and then operations may be undertaken to communicate with and query the data stores 116 and 118 respectively. The requested data may then be returned to the API interpreter 136 separately as customer name, social security number, and address. The API interpreter 136 may then combine the customer name, social security number, and address into the requested customer record and send the customer record to the application 132 in order to fulfill the data request.

In one aspect, the API interpreter 136 is generated by the modeler 104 based on a model of the computing resources, data, metadata, and/or the relationships between computing resources and data available to the client 134. The metadata may be either structural or descriptive metadata that provides information about the data meaning of the data in data stores 116 and 118. The API updater 112 may be able to update the API interpreter 136 based on changes to the computing resources, data, metadata, attributes and/or the relationships between computing resources and data available to the client 134. The API(s) associated with the API interpreter 136 at the client 134, such as APIs 138, 140, and 142, may or may not be generated by the modeler 104 and may or may not be updated by the API updater 112.

In one aspect, the API interpreter 136 subscribes to updates made to the API 110 (e.g. via the modeler 104). The updates may be a change in format for the computing resources associated with the API 110. Updates that are made to the API may be pushed out from the API updater 112 to the client 134 and these updates can update the definitions of the API calls and the translation that needs to occur between the data requests and API calls. The API interpreter 136 may then adjust the format of a subsequent API call to match the changes made by the updates to the API 110.

This technology provides results where even if APIs are updated, this is unlikely to affect the application, process or service making the data request. This is because the data request can remain the same while the definitions of the API are modified. Thus, the updates provided, may be managed by the API updater 112 and the service provider environment 102 without notifying customer to modify or re-compile the customers application.

In one aspect, the API interpreter 136 may function to control the data that is returned to the application 132. For example, the client 134 may be a mobile device and the application 132 is designed specifically for use with the mobile device. The application 132 may send a request for data, but the mobile device does not desire all data that may be returned based on the request. For example, the requested data may be for a customer's records hosted in data store 116. The customer records may contain customer names as well as other customer details, but the application 132 for the mobile device may have limited the requested data to the customer name. The API interpreter 136 may then function to restrict or control the data returned from the data store 116 via the API 110 to only include the customer name. Thus, the application 132 may request specific data that is populated in a certain field.

In one aspect, the data requested by the application 132 may cause the API interpreter 136 to receive more data from the data store than what was requested. The API interpreter 136 may then only return the portion of the data that was requested by the application 132. In other words, not all data returned to the API interpreter 136 by the data store via the API 110 is necessarily returned to the application 132.

Figure 3:
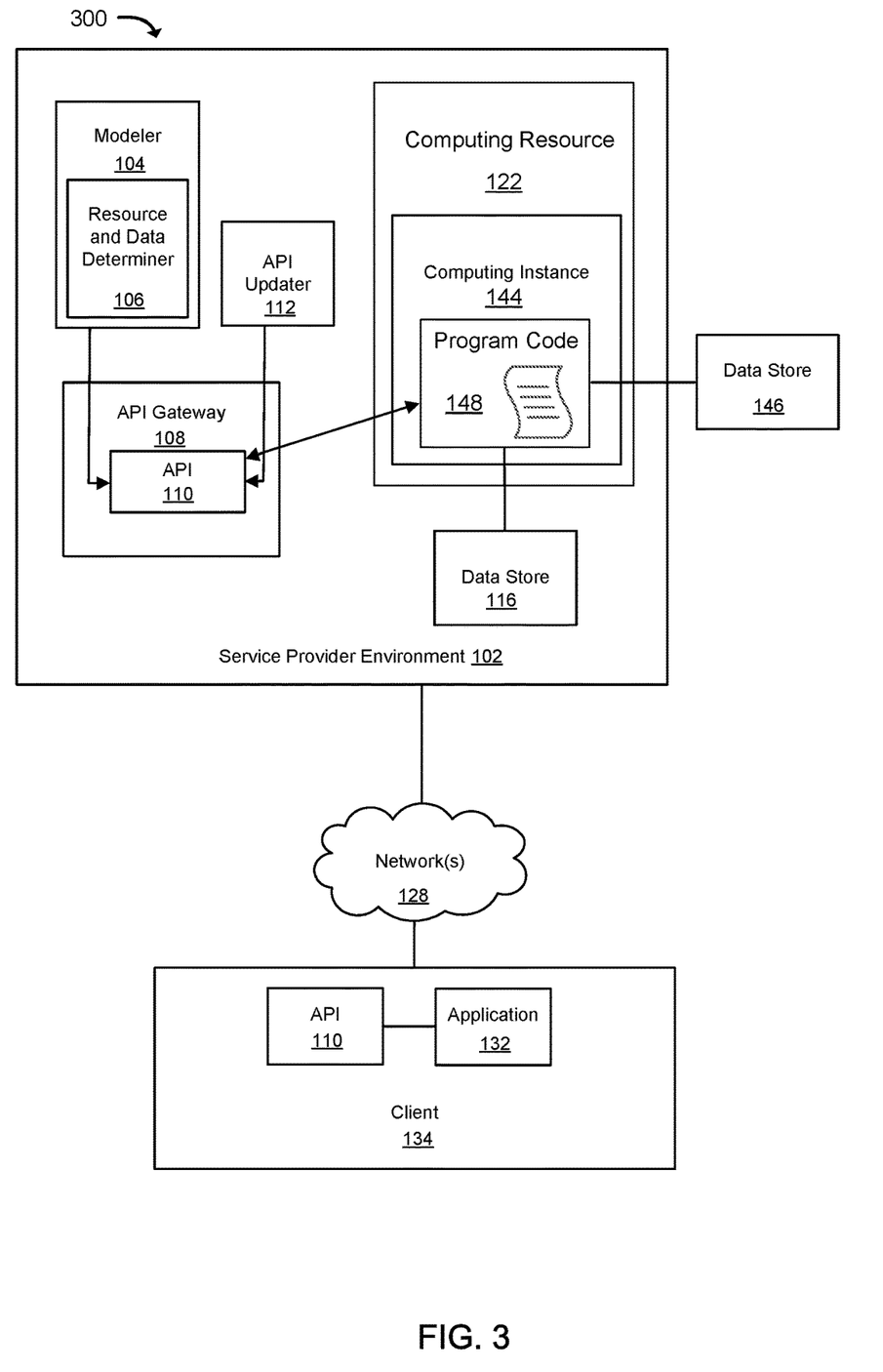
FIG. 3 is a block diagram illustrating a system for triggering a program code in response to an API call according to an example of the present technology.

FIG. 3 illustrates a computing environment 300 for generating an API according to an example of the present technology. The computing environment 300 comprises a computing instance 144, a program code 148, and may include some or all of the features, components, and capabilities of the computing environment 100 of FIG. 1 and the computing environment 200 of FIG. 2.

In one aspect, an API call from the client 134 to the API 110 may trigger a program code 148 at the API 110 where the program code 148 performs a processing operation in the service provider environment 102 using the data store 116 and the computing resources provided in a customer account associated with the API 110. The program code 148 allows an API call to automatically trigger a complex operation or function that may beyond the abilities of an API call with commands such as CRUD commands. Thus, the program code 148 may allow simple operations or commands in an API call to build up through a hierarchy to complete complex functions such as a modifying or managing a backend data schema.

The computing resource 122 may include a computing instance 144 with access to the data store 116 or other data stores. The compute instance 144 may include a program code 148 that is capable of executing on the computing instance. The program code 148 is a segment of program code 148 that may be like a function, and the program code 148 may receive parameters, perform processing and provide return values to the API 110. The program code 148 may also be called a "compute service code" or "compute service program code." In one aspect, the program code 148 may execute on a managed compute service code platform for back-end web services that runs a defined program code 148 on the computing instance 144. That is, the program code 148 may execute in a compute service that runs code in response to requests to execute the program code 148, and automatically manages the compute resources used by that program code 148. Once the program code 148 has been executed and the appropriate results have been returned, the program code 148 and results may be flushed from memory of the computing instance 144 or container in which the program code 148 was executing. The program code 148 provides for building smaller, on-demand applications that may be responsive to events and new information. For example, the program code 148 may be used to automatically provision back-end services triggered by custom program code 148 requests. In one aspect, the program code 148 may be triggered in response to an event, may execute or perform a function in response to the event, and may return a response or value. In an additional aspect, a data store 146 may be an additional data store located outside of the service provider environment 102. For example, the data store 146 may be in a private data center or at another remote location accessible via the internet.

In one aspect, the program code 148 may be automatically generated by the modeler 104. For example, the modeler 104 may automatically generate the program code 148 as a custom piece of code based on the resources determined by the resource and data determiner 106. The custom code may interact with the API 110 and the owner of the API 110 can control the custom code. In one example, the program code 148 may be generated by extracting data store rules, triggers or data store procedures from available data stores such as the data stores 116 and 146 and using those data store rules, triggers or data store procedures in the program code 148. In one aspect, the program code 148 is generated or created by another resource other than modeler 104 and may or may not be created specifically for the API 110. In one aspect, the program code 148 is generated or created by manually by a user.

In operation, by way of example only, one or more additional API calls (in addition to the original API call to the API gateway 108) may be defined at the API 110 including one or more API call parameters to be sent to the program code 148 and then optionally on to one or data stores, such as data stores 116, 146 available to the client 134. The initial API call may be sent from the client 134 and then one or more additional API calls may be made or redirected from the API gateway 108. The data stores 116, 146 may be queried by the program code 148 for data requested by the application 132. The program code 148 may perform any functions that are coded into source code of the program code 148 including performing complex backend functions related to the data stores. For example, the program code 148 may include calls to additional computing instances, managed services, cluster databases, data store services, NoSQL data stores, distributed applications, custom applications, etc. that are accessible within or from the service provider environment 102.

The data response received from the data store 116 may be used to form a data response to the API call made to launch the program code 148. The program code 148 may have performed any computing functions that the program code 148 has been programmed to perform and then the results may be returned in the form defined by program code 148.

Figure 4:
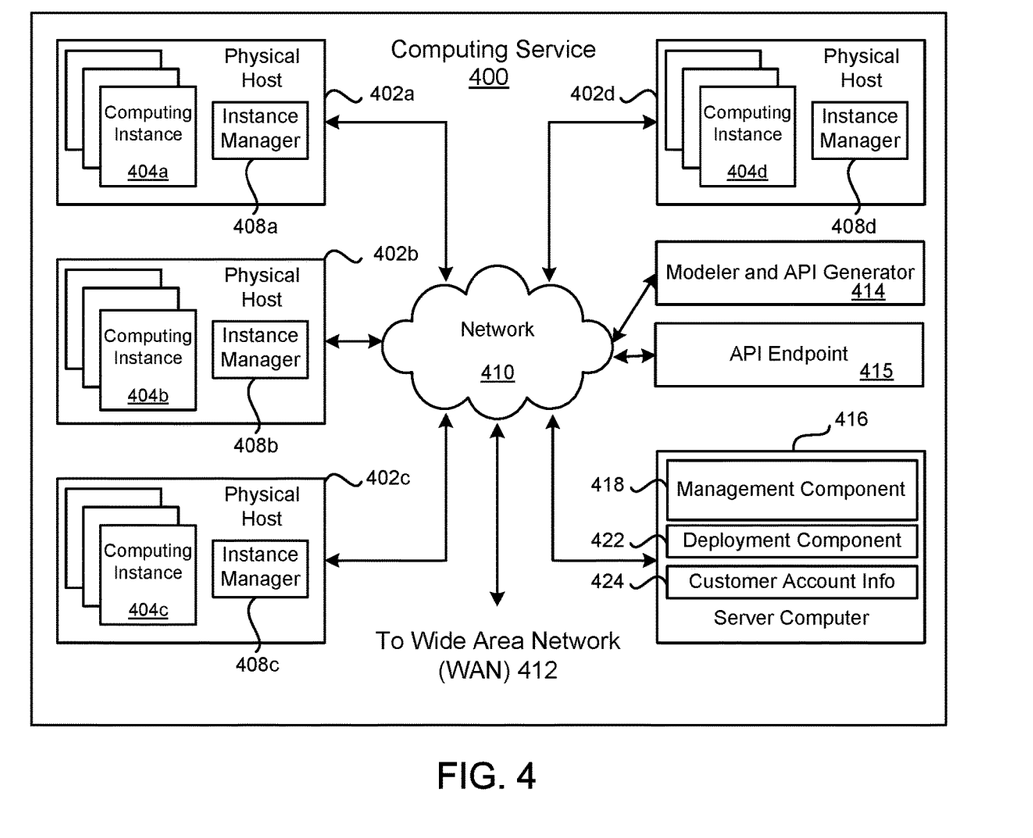
FIG. 4 is a block diagram that illustrates an example computing service environment according to an example of the present technology.

FIG. 4 is a block diagram illustrating an example computing service 400 that may be used to execute software services in a computing service environment or service provider environment. In particular, the computing service 400 depicted illustrates one environment in which the technology described herein may be used. The computing service 400 may be one type of environment that includes various virtualized service resources that may be used, for instance, to host computing instances 404a-d on which a computing service may execute.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked clients, such as desktop computers, laptops, tablets, smartphones, etc. running web browsers or other lightweight client applications, for example. Illustratively, the computing service 400 may be described as a "cloud" environment.

The particularly illustrated computing service 400 may include a plurality of server computers 402a-d. While four server computers are shown, any number may be used, and large data centers may include thousands of server computers. The computing service 400 may provide computing resources for executing computing instances 404a-d. Computing instances 404a-d may, for example, be virtual machines. A virtual machine may be an instance of a software implementation of a machine (i.e., a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

Some of the servers may be used for modeling computing resources and data available to a client computer system, generating an API, and hosting an API at an API gateway. For example, a modeler and API generator 414 may model computing resources and data hosted by the service provider environment and that are available to a customer account that owns the API. Based on the modeling, the modeler and API generator 414 may automatically generate an API for use by the client computer system. The API may be hosted by the API gateway 415 that acts as a gateway to receive API calls from the client computer system and for the API to access the computing resources and data.

One or more server computers 416 may be reserved to execute software components for managing the operation of the computing service 400 and the computing instances 404a-d. A server computer 416 may execute a management component 418. A customer may access the management component 418 to configure various aspects of the operation of the computing instances 404a-d purchased by a customer. For example, the customer may setup computing instances 404a-d and make changes to the configuration of the computing instances 404a-d.

A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache may be prepared, and other types of information. The deployment component 422 may utilize the customer-provided configuration and cache logic to configure, initialize, and launch computing instances 404a-d. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402a-d, 416. The network 410 may be a local area network (LAN) and may be connected to a Wide Area Network (WAN) 412 or the Internet, so that end customers may access the computing service 400. The network topology illustrated in FIG. 4 has been simplified; many more networks and networking devices may be utilized to interconnect the various computing systems disclosed herein.

Figure 5:
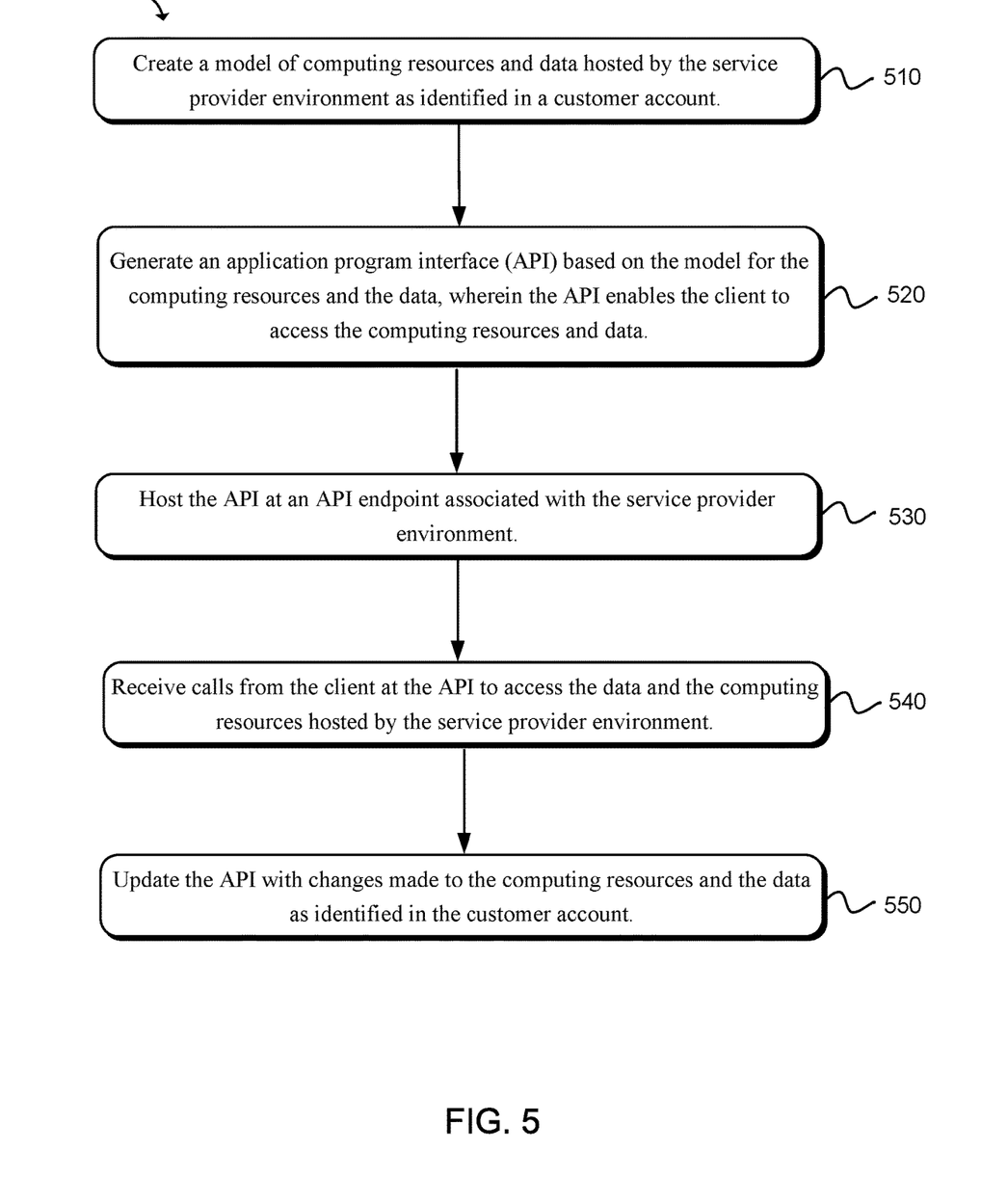
FIGS. 5 and 6 are flowcharts of example methods for generating an API according to an example of the present technology.

FIG. 5 is a flowchart of an example method 500 for generating a customized application program interface (API) in a service provider environment according to an example of the present technology. The functionality 500 may be implemented as a method and executed as instructions on a machine, where the instructions are included on at least one computer readable medium or one non-transitory machine-readable storage medium. For example, starting in block 510, a model may be created of the computing resources and data hosted by the service provider environment as identified in a customer account. An application program interface (API) may be generated based on the model for the computing resources and the data, wherein the API enables a client to access the computing resources and data, as in block 520. The API may be hosted at an API gateway associated with the service provider environment, as in block 530. Calls from the client may be received at the API to access the data and the computing resources hosted by the service provider environment, as in block 540. The API may be updated with changes made to the computing resources and the data as identified in the customer account, as in block 550.

In one aspect, the method 500 further comprises receiving a request for the data in a data request format at an API interpreter from an application associated with the client computer system, translating the request from the data request format to an API call, and sending the request to the service provider environment. In another aspect, the API interpreter may subscribe to updates to the API from a modeler and may adjust a format of a subsequent API call to match changes made by the updates from the API in order to insulate the client from API changes. The calls from the client may be RESTful API calls.

Figure 6:
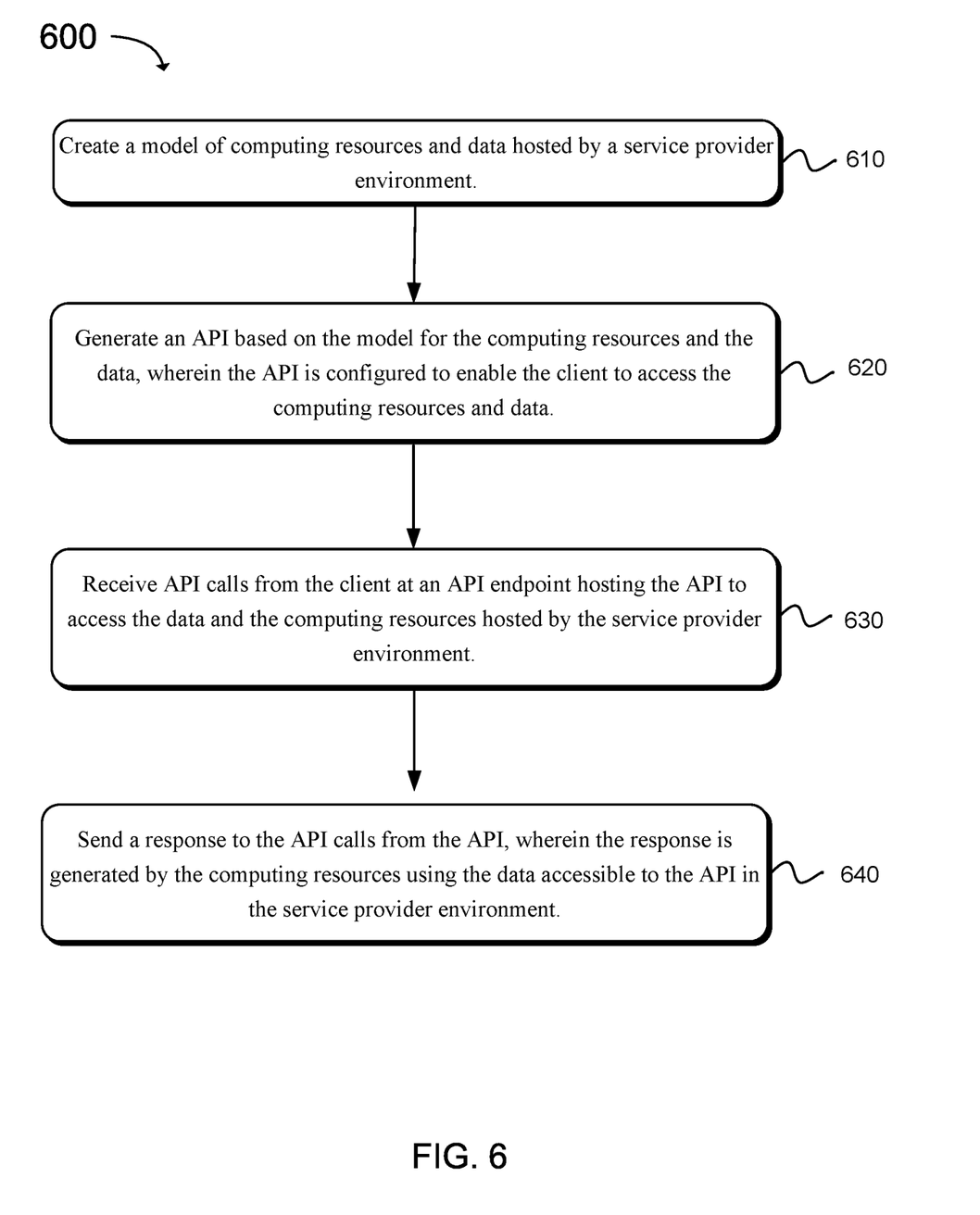

FIG. 6 is a flowchart of an example method 600 for generating a customized application program interface (API) in a service provider environment according to an example of the present technology. The functionality 600 may be implemented as a method and executed as instructions on a machine, where the instructions are included on at least one computer readable medium or one non-transitory machine-readable storage medium. For example, starting in block 610, a model may be created of computing resources and data hosted by the service provider environment and provided by a customer. An application program interface (API) may be generated based on the model for the computing resources and the data, wherein the API enables the client to access the computing resources and data, as in block 620. Calls from the client may be received at the API to access the data and the computing resources hosted by the service provider environment, as in block 630. A response to the calls may be sent wherein the response is generated by the computing resources and fulfilled with the data available to the client in the service provider environment and the response is sent by the API, as in block 640.

In one aspect, the method 600 further comprises updating the API in response to changes made to the computing resources and the data available to the client to insulate the client from the changes. In another aspect, the method 600 further comprises hosting an API interpreter in the client that is configured to receive a request for data in a data request format at the API interpreter from an application associated with the client. The request for the data may be translated from the data request format to an API call for the API, and then the API call may be sent to the service provider environment. The API interpreter may subscribe to updates to the API from a modeler and may adjust a format of a subsequent API call to match changes made by the updates. In one aspect, the API call is fulfilled by the service provider environment and returned to the application via the API interpreter that supplies the data in the data request format. The request for the data in the data request format may not be an API call but may be translated to an API call.

In one aspect, the calls from the client computer system are RESTful API calls. For example, the calls from the client computer system are commands to create, read, update, and/or delete data and/or resources. In one aspect, the model is also created based on relationships between the computing resources and the data hosted by the service provider environment as well as the metadata associated with the data. In one aspect, the API receives requests, such as API calls, and responds to the requests in a JavaScript Object Notation (JSON) format.

In one aspect, the method 600 further comprises generating a software development kit (SDK) for the API created for the client. In one aspect, an API call from the client computer system triggers a program code through the API wherein the program code performs a processing operation in the service provider environment using the data and the computing resources. The API may receive more data from the computing resources than what is requested by the API calls but the API may return only the data that is requested by the API calls. In one aspect, the computing resources hosted by the service provider environment are virtual computing resources.

Figure 7:
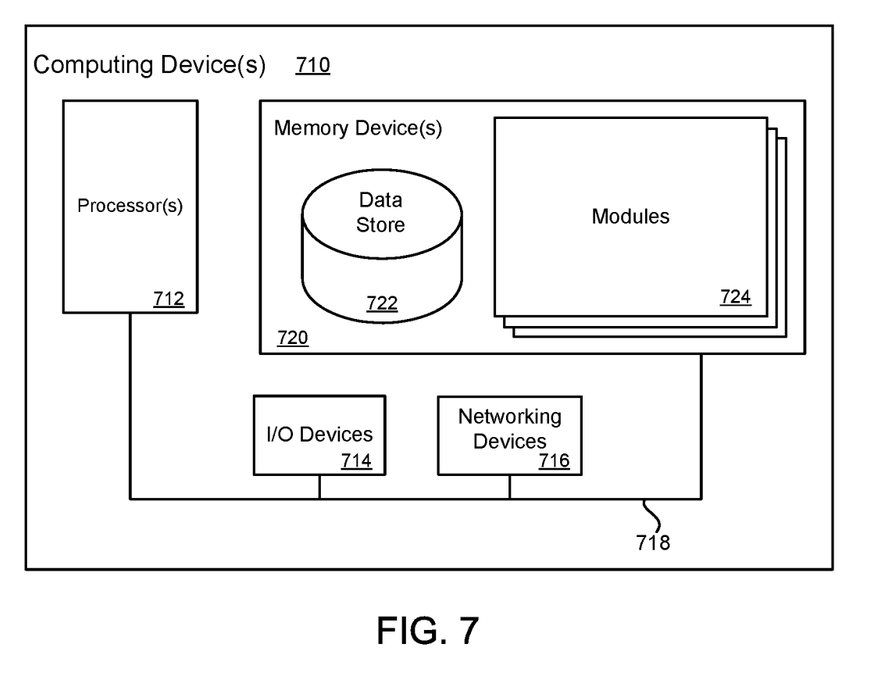
FIG. 7 is a block diagram that provides an example illustration of a computing device that may be employed in the present technology.

FIG. 7 illustrates a computing device 710 on which modules of this technology may execute. A computing device 710 is illustrated on which a high-level example of the technology may be executed. The computing device 710 may include one or more processors 712 that are in communication with memory devices 720. The computing device may include a local communication interface 718 for the components in the computing device. For example, the local communication interface may be a local data bus and/or any related address or control busses as may be desired.

The memory device 720 may contain modules 724 that are executable by the processor(s) 712 and data for the modules 724. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. An example of an I/O device is a display screen that is available to display output from the computing devices. Other known I/O device may be used with the computing device as desired. Networking devices 716 and similar communication devices may be included in the computing device. The networking devices 716 may be wired or wireless networking devices that connect to the Internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid-state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configuration definitions, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations that comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed cause a processor to perform a method for generating a customized application program interface (API) in a service provider environment, the method comprising:
   creating a model of virtual computing resources and data hosted by the service provider environment as identified in a customer account;
   generating an application program interface (API) based on the model for the virtual computing resources and the data, wherein the API enables a client to access the virtual computing resources and data;
   hosting the API at an API gateway associated with the service provider environment;
   receiving calls from the client at the API to access the data and the virtual computing resources hosted by the service provider environment; and
   updating the API with changes made to the virtual computing resources and the data as identified in the customer account.

2. The non-transitory machine readable storage medium of claim 1, further comprising:
   receiving a request for the data in a data request format at an API interpreter from a client;
   translating the request from the data request format to an API call; and
   sending the API call to the service provider environment for fulfillment.

3. The non-transitory machine readable storage medium of claim 2, wherein the API interpreter subscribes to updates to the API from a modeler and adjusts a format of a subsequent API call to match changes made by the updates from the API in order to insulate the client from API changes.

4. The non-transitory machine readable storage medium of claim 1, wherein the calls from a client are RESTful API calls.

5. A method for generating a customized application program interface (API) in a service provider environment, comprising:
   creating a model of computing resources and data hosted by a service provider environment, wherein the computing resources are one or more application servers in the service provider environment;
   generating an API based on the model for the computing resources and the data, wherein the API is configured to enable the client to access the computing resources and data;
   receiving API calls from the client at an API gateway hosting the API to access the data and the computing resources hosted by the service provider environment;
   sending a response to the API calls from the API, wherein the response is generated by the computing resources using the data accessible to the API in the service provider environment; and
   updating the API in response to changes made to the computing resources and the data as identified in a customer account.

6. The method of claim 5, further comprising:
   hosting an API interpreter in the client;
   receiving a request for the data in a data request format at the API interpreter from the client;
   translating the request for the data in the data request format to an API call for the API; and
   sending the API call to the service provider environment.

7. The method of claim 6, wherein the API interpreter subscribes to updates to the API from a modeler and adjusts a format of a subsequent API call for the request for data in the data request format to match changes made by the updates.

8. The method of claim 6, wherein the API call is fulfilled by the service provider environment and returned to the client via the API interpreter which supplies the data in the data request format.

9. The method of claim 6, wherein the request for the data in the data request format is not an API call.

10. The method of claim 5, wherein the API calls from the client are RESTful API calls.

11. The method of claim 5, wherein the API calls from the client are commands to create, read, update, and/or delete.

12. The method of claim 5, wherein the model is also created based on relationships between the computing resources and the data hosted by the service provider environment as well as metadata associated with the data.

13. The method of claim 5, wherein the API receives and responds to the API calls in a JavaScript Object Notation (JSON) format.

14. The method of claim 5, further comprises:
   generating a software development kit (SDK) for the API created for the client, wherein the SDK is loadable on the client.

15. The method of claim 5, wherein an API call from the client triggers a program code and the program code performs a processing operation in the service provider environment using the data and the computing resources.

16. The method of claim 5, wherein the API filters data received from the computing resources based on what is requested by the API calls and the API returns filtered data in response to the API calls.

17. The method of claim 5, wherein the computing resources hosted by the service provider environment are virtual computing resources.

18. A system for translating a data request to an application program interface (API) call, comprising:
   a client computer system comprising:
     at least one processor; and
     at least one memory device including a data store to store a plurality of data and instructions that, when executed by the at least one processor, cause the client computer system to:
     execute an application to make requests for data in a data request format; and
     host an API interpreter configured to receive the requests for data, to translate the requests for data to an API call, and to send the API call to an API hosted by a service provider environment, wherein the API is generated based on a model of data and virtual computing resources hosted by the service provider environment and the API is updated with changes made to the computing resources, and the API interpreter is configured to translate a response to the API call into the data request format and send the response in the data request format to the application.

19. The system of claim 18, wherein the API interpreter subscribes to updates to the API from a modeler and adjusts a format of API calls to match changes made by the updates.

\* \* \* \* \*